United States Patent

Janiszewski

[11] 4,003,283
[45] Jan. 18, 1977

[54] DIE SET WITH TWO-PART LEADER PINS AND BALL BEARING GUIDE

[76] Inventor: Kasimir Janiszewski, 11908 W. Loomis Road, Franklin, Wis. 53132

[22] Filed: July 28, 1975

[21] Appl. No.: 599,756

[52] U.S. Cl. .................... 83/637; 83/140; 83/698; 308/4 C; 308/6 B
[51] Int. Cl.² .................. B26D 7/00; F16C 19/00
[58] Field of Search ............ 83/140, 637, 698; 308/4 C, 6 B, 239, 237 A, 237 R

[56] References Cited
UNITED STATES PATENTS

| | | | |
|---|---|---|---|
| 2,823,960 | 2/1958 | Blazek et al. | 83/637 X |
| 2,906,563 | 9/1959 | Conner | 83/637 X |
| 3,357,755 | 12/1967 | Danly | 83/637 X |
| 3,568,555 | 3/1971 | Stroh | 83/637 X |
| 3,742,797 | 7/1973 | Vecchi | 83/698 X |

Primary Examiner—Willie G. Abercrombie
Attorney, Agent, or Firm—Henry C. Fuller

[57] ABSTRACT

Disclosed herein is a die set in which the punch holder is guided for reciprocating movement towards and away from the die shoe by two-part leader pins, with the upper leader pin portions fixed to the punch holder and the lower leader pin portions fixed to the die shoe. Tapered surfaces on the upper leader pin portions are received in ball bearing cages located within sleeves on the lower leader pin portions to guide the movement of the punch holder. The tapered leader pin portions press the bearing balls into the sleeve to provide a tight shearing fit with no tolerance which minimizes deflection of the punch holder to provide more accurate punching.

5 Claims, 2 Drawing Figures

DIE SET WITH TWO-PART LEADER PINS AND BALL BEARING GUIDE

BACKGROUND OF INVENTION

The invention is a further development of the subject matter in my co-pending application Ser. No. 507,637 now U.S. Pat. No. 3,926,083.

SUMMARY OF THE INVENTION

The invention provides a die set which employs two-part leader pins for guiding reciprocal movement of the punch holder with respect to the die shoe and for controlling the length of travel of the punch holder towards the die shoe. A tapered male surface on the upper leader pin travels into the throat of a ball bearing cage supported within a sleeve supported by the lower leader pin portion. The bearing cage and tapered leader pin surfaces afford precise positioning of the male die or punch with respect to the female die with minimal or no deflection when the work material is engaged.

Spring biasing means are provided for supporting the bearing cage within the sleeve to hold the bearing cage in an initial elevated position to permit entry of the upper leader pin into the bearing cage when the bearing balls are loose in the cage and thus provide uniform guided movement of the leader pins. The height of the sleeve can be adjusted so that the punch does not enter the female die, which results in a longer life for the punch.

Further objects, advantages and features of the invention will become apparent from the following disclosure.

DETAILED DESCRIPTION OF THE PREFERRED EMBODIMENT

Figure 1:
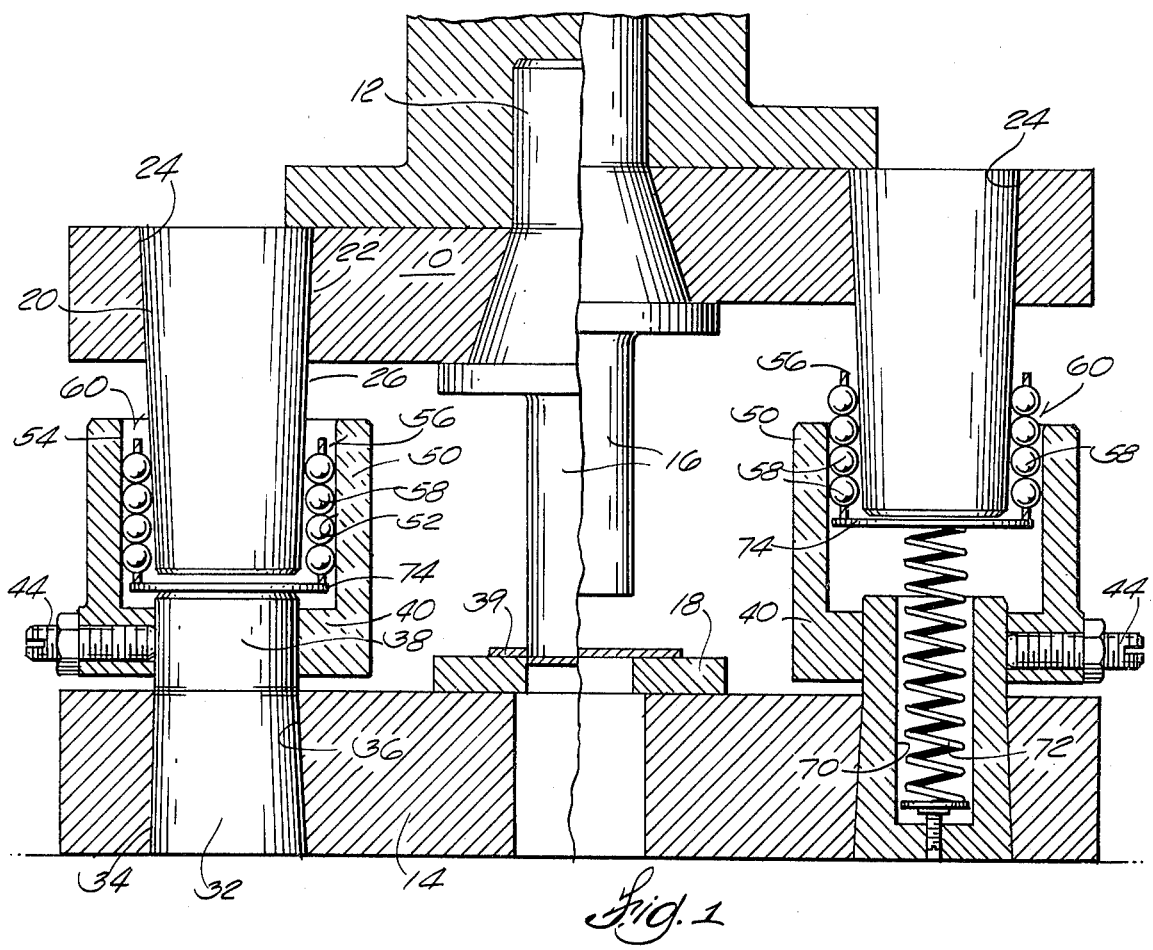
FIG. 1 is a side elevational view of a die set embodying the invention in fragmentary section and showing the punch and punch holder in retracted and advanced positions.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The die set conventionally includes a punch holder 10 connected to a mounting lug 12, and a die shoe 14. The punch holder 10 carries a punch or male die member 16, and a female die 18 is supported on the die shoe 14. In accordance with the invention there are provided upper leader pin portions 20 which can have tapered shanks 22 in a press fit in apertures 24 in the punch holder 10. The leader pin portions 20 are also provided with a tapered surface 26 which can be a continuation of tapered surface 22.

The lower leader pin portions 32 can have tapered surfaces 34 received in tapered apertures 36 in the die shoe 14. Projecting above the die shoe is a lower leader pin shank portion 38. The shank portions 38 are connected to sleeves 40. Means are provided for adjustably securing the sleeve 40 to the lower leader pin portion 32. In the construction disclosed in FIG. 1, the means comprises set screws 44. The set screws 44 enable adjustment of the position of the sleeve 40 relative to the die 18 or material to be punched 39 to prevent penetration of the punch into the female die.

The sleeves 40 are provided with a bore 52 having an internal surface 54. Located within the bore 52 is a ball bearing cage 56 containing a plurality of bearing balls 58. The bearing balls 58 are supported in the cage 56 and provide a throat 60 which receives the upper leader pin portion 20.

Figure 2:
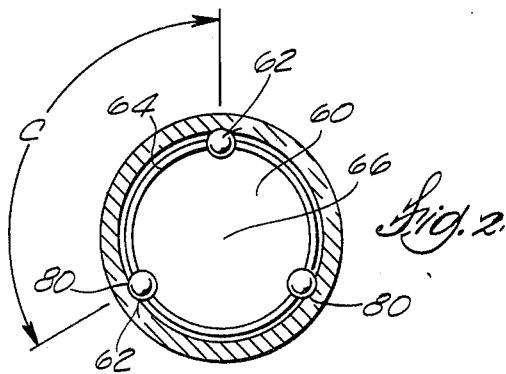
FIG. 2 is a plan view of one form of a bearing retainer and a fragmentary sectional view of a guide sleeve.

The bearing balls 58 can be arranged in generally vertical rows 62 to provide uniform contact along the sleeve 50. FIG. 2 shows a bearing cage 64 with 3 vertical rows of balls with the rows equally spaced at an angle C of 120° about the vertical axis 66 of the cage. Such a row orientation is believed to give maximum precision to the guided movement of the punch 16.

Biasing means can be provided for supporting the bearing cage 56 above the sleeve 50 initially to provide loose contact of the bearing balls 58 and leader pin portions 26 initially to facilitate lead-in. In the disclosed construction the means includes a bore 70 carrying a spring 72 which engages a bearing cage seat 74 which is freely movable in sleeve 50.

The bearing cage 56 is fitted to the tapered surfaces 26 so that the bearing balls 58 are in rolling contact with the internal surfaces 54 of the sleeves and the tapered surfaces 26 of the leader pin and thus the bearing cages are reciprocated with movement of the leader pins but at a different speed depending on the diameter of the balls. The slight taper of the surface 26 of the leader pins provide a shearing fit of the leader pins and the upper bearing balls to minimize or eliminate deflection of the punch. The tapered surface of the pins 26 presses the bearing balls 60 into the surface of the sleeve 50 to form grooves 80 (FIG. 2).

The use of ball bearing cages and tapered leader pins as disclosed herein provides uniformity in guided movement of the upper leader pin portions with a minimum of wear to the sleeve 50 and leader pins 20.

What is claimed is:

1. In a die set including a punch holder and a die shoe, the improvement comprising an assembly of an upper leader pin portion mounted on said punch holder and having a tapered surface decreasing in diameter remote from said punch holder, a lower leader pin portion connected to said die shoe, a sleeve arranged around said lower leader pin and having a bore located in the path of travel of said upper leader pin, a ball bearing cage located in said bore and having a throat adapted to receive said upper leader pin tapered portion and guide said punch holder during reciprocal movement of said punch holder toward and away from said die shoe and means for supporting said ball bearing cage in said sleeve, said tapered surface, said sleeve bore and said ball bearing cage being sized to afford a tight shearing fit with the bearing balls pressing into the sleeve with no tolerance to minimize deflection of the punch holder.

2. The improvement of claim 1 wherein said means for supporting said bearing cage includes a plate beneath said cage and within said sleeve and biasing means associated with said lower leader pin portion for urging said bearing cage upwardly in said sleeve.

3. The improvement of claim 2 wherein said biasing means comprises a bore in said lower leader pin portion, and a spring located in said bore.

4. The improvement of claim 1 wherein said bearing cage includes three vertical rows of bearing balls with said rows angularly spaced at 120°.

5. The die set of claim 1 including a second of said assemblies.

* * * * *